US011037163B2

(12) United States Patent
Breitling et al.

(10) Patent No.: US 11,037,163 B2
(45) Date of Patent: Jun. 15, 2021

(54) METHOD AND A DEVICE FOR DENYING OR NULLIFYING A SPECIFIC ONLINE TRANSACTION CARRIED OUT BY AN AUTHORIZED USER WHO IS COACHED BY A FRAUDSTER

(71) Applicant: BehavioSec Inc, San Francisco, CA (US)

(72) Inventors: Julian Breitling, Lulea (SE); Ingo Deutschmann, Merseburg (DE); Per Burstrom, Lulea (SE)

(73) Assignee: BEHAVIOSEC INC, San Francisco, CA (US)

( * ) Notice: Subject to any disclaimer, the term of this patent is extended or adjusted under 35 U.S.C. 154(b) by 0 days.

(21) Appl. No.: 17/114,707

(22) Filed: Dec. 8, 2020

(65) Prior Publication Data

US 2021/0117979 A1   Apr. 22, 2021

(51) Int. Cl.
| | |
|---|---|
| G06K 5/00 | (2006.01) |
| G06Q 20/40 | (2012.01) |
| G06K 9/62 | (2006.01) |
| H04L 29/08 | (2006.01) |
| G06Q 20/08 | (2012.01) |

(52) U.S. Cl.
CPC ......... *G06Q 20/4016* (2013.01); *G06K 9/628* (2013.01); *G06Q 20/085* (2013.01); *H04L 67/22* (2013.01)

(58) Field of Classification Search
CPC .... G06Q 20/4016; G06Q 50/01; G06Q 20/40; H04W 12/06; G06F 2221/2133; G06F 21/6245; H04L 63/08
USPC ........................................ 235/380, 383, 385
See application file for complete search history.

(56) References Cited

U.S. PATENT DOCUMENTS

| | | | |
|---|---|---|---|
| 9,516,035 B1* | 12/2016 | Moritz | ................ H04L 63/0861 |
| 9,882,918 B1* | 1/2018 | Ford | ..................... H04L 67/306 |
| 2006/0282660 A1* | 12/2006 | Varghese | ........... G06Q 20/4016 |
| | | | 713/155 |
| 2015/0363785 A1* | 12/2015 | Perez | ................... G06Q 20/206 |
| | | | 705/44 |
| 2019/0158535 A1 | 5/2019 | Kedem et al. | |

* cited by examiner

*Primary Examiner* — Daniel St. Cyr
(74) *Attorney, Agent, or Firm* — Michael J. Feigin, Esq.; Feigin and Fridman LLC (57) ABSTRACT

A method for denying or nullifying a specific online transaction carried out by a specific user using a computing device associated with at least one input interface, while the specific user was coached by a fraudster. The method includes collecting a specific set of behavioral data relating to the behavior of the specific user during a specific online transaction, and using a multi-dimensional classification module to determine a probability that the specific user was coached during collection of the set of behavioral data. In response to the probability being greater than a predefined threshold, the specific transaction is denied or nullified.

16 Claims, 4 Drawing Sheets

METHOD AND A DEVICE FOR DENYING OR NULLIFYING A SPECIFIC ONLINE TRANSACTION CARRIED OUT BY AN AUTHORIZED USER WHO IS COACHED BY A FRAUDSTER

FIELD AND BACKGROUND OF THE DISCLOSED TECHNOLOGY

The disclosed technology relates generally to authentication devices and methods, and, more specifically, to a device and a method for denying or nullifying a coached fraudulent transaction, which is an online transaction carried out by an authorized user, while the authorized user is coached by a fraudster, for example over the phone. Such coached fraudulent transactions are also known as vishing attacks.

Electronic devices are used by millions of people to perform many types of operations, such as communicating with other people (e.g. by email, instant messaging, phone calls, and video chats), capturing memories (e.g. taking pictures, videos, and voice recordings), entertainment (e.g. listening to music, watching videos, playing games), financial transactions (e.g. access to bank accounts, transferring funds, shopping) and the like.

Some of the more sensitive transactions that may be carried out using electronic devices, such as transactions requiring transfer of funds (e.g. shopping, bank account transactions, and the like), require authentication of the user in order to ensure that the user carrying out the transaction is indeed the human authorized to do so.

In an attempt to get around the authentication requirements, criminals and fraudsters have developed different types of attacks in which the authorized user is authenticated, but the transaction is a fraudulent transaction, not the transaction the authorized user thinks he/she is conducting.

One such type of attack, is a "phishing" attack, in which the fraudster creates a fraudulent log-in interface or sends a fraudulent request, posing as an actual website or an authorized service provider. The unsuspecting user then provides their authentication information or their restricted information (such as bank account or credit card information) enabling the attacker to steal the user credential and use them freely for purposes of fraud and theft. There are many mechanism known in the art for detection of such phishing attacks.

Another type of attack is known as a "vishing" attack, in which a fraudster poses as an authorized service provider, and guides an unsuspecting authorized user through the various steps of performing an electronic financial transaction. For example, the fraudster may telephone the victim and provide oral instructions for performing the transaction. However, the transaction is a fraudulent transaction. For example, the attacker may guide the user to access an authentic website, such as their actual bank account, and to wire money to a specific bank account number of the attacker, while pretending that this is required in order to move the bank account of the victim to a safer account, or to open a pension fund or an insurance fund for the victim.

Vishing attacks are difficult to detect, because the user conducting the electronic transaction is the authorized user using his/her standard electronic device and IP address, and providing his/her actual authentication credentials of the authorized user. In fact, any security measures aimed to authenticate the identity of the user, such as two-factor authentication or use of biometric data, would be ineffective for identifying a vishing attack, because the authorized user is the one carrying out the transaction.

It has been discovered that vishing attacks may be detected by detecting behavioral traits of the user. For example, a user being coached through an operation, may be waiting to receive the next instruction from the coaching fraudster, which wait time does not exist when the user performs the same transaction of their own volition, without being coached.

U.S. Patent Application Publication No. 2019/0158535 to Kedem et al describes a system for detecting a vishing attack, and relates to various detectors for behavior, such as a data entry rhythm detector, a spatial characteristics detector, a doodling detector, and a typographical errors rhythm detector.

There is thus a need in the art for a system and method for denying or nullifying coached fraudulent transactions, which system is a learning system automatically learning the thresholds and weights assigned to each of various input parameters in order to identify coached fraudulent transactions at a high confidence.

SUMMARY OF THE DISCLOSED TECHNOLOGY

The disclosed technology relates generally to authentication devices and methods, and, more specifically, to a device and a method for denying or nullifying a coached fraudulent transaction or vishing attack, which is an online transaction carried out by an authorized user, while the authorized user is coached by a fraudster, for example over the phone.

In the context of the present specification and claims, the term "dataset" or "set of data" is defined as a data sample including all the data collected during a single recorded user session, or during a single specific online transaction.

In the context of the present specification and claims, the term "approximately" is defined as being within 10% of a target number or measure.

It should be understood that the use of "and/or" is defined inclusively such that the term "a and/or b" should be read to include the sets: "a and b," "a or b," "a," "b."

According to an aspect of some embodiments of the teachings herein, there is provided a method for denying or nullifying a specific online transaction carried out by a specific user using a computing device associated with at least one input interface while the specific user was coached by a fraudster. The method includes collecting, from the computing device, a specific set of behavioral data relating to the behavior of the specific user during a specific online transaction, the specific user being authorized for carrying out the specific online transaction, and using a multi-dimensional classification model, determining a probability that the specific set of behavioral data was collected while the specific user was coached by a third party. Subsequently, the probability is compared to a predefined threshold, and in response to the probability being higher than the predefined threshold, indicative of the specific user having been coached during the specific online transaction, the specific online transaction is denied or nullified.

The multi-dimensional classification model is trained prior to the determining, using a plurality of training sets of behavioral data relating to the behavior of one or more users during an online transaction, where each specific training set is associated with a classification indicating whether the specific training set was generated when the user was coached during the online transaction.

Each of the plurality of training sets and the specific set of behavioral data includes at least two behavioral parameters selected from the group consisting of:

a total timespan from selecting a text field for input thereinto, to leaving the text field, for at least one of a text field relating to a recipient account identifier, a text field relating to a recipient name, and a text field relating to an amount;

a number of times during a corresponding online transaction that a corresponding user stops moving a cursor;

a number of times during a corresponding online transaction that at least one of a plurality of cursor criteria is outside of a corresponding predetermined range;

a timespan between selecting the text field relating to a recipient name and beginning to enter input into the text field relating to a recipient name;

a total time spent on a monetary transfer page during the corresponding online transaction;

a total time during which a cursor was immobile while interacting with the monetary transfer page during the corresponding online transaction;

a timespan between selecting the text field relating to a recipient account identifier and beginning to enter input into the text field relating to a recipient account identifier; and a number of cursor engagements in the monetary transfer page during the corresponding online transaction.

In some embodiments, the at least one input interface includes a mouse. In such embodiments, the cursor engagements include mouse clicks, and the cursor criteria include, for a specific mouse gesture, at least one of the following criteria:

a ratio between the shortest distance between two endpoints of the specific mouse gesture and the length of the specific mouse gesture;

a linearity measure indicating how similar the specific mouse gesture is to a straight line;

a ratio between the length of the specific mouse gesture and the length of a perimeter of a rectangle enclosing the specific mouse gesture;

a maximal change in the x-direction during the mouse gesture; and a maximal change in the y-direction during the mouse gesture.

In some embodiments, the specific online transaction is a banking transaction.

In some embodiments, the specific set of behavioral data includes data relating to the entirety of the specific online transaction.

In some embodiments, the collecting and the determining are carried out in real time, during the specific online transaction. In such embodiments, in response to the probability being higher than the predefined, the specific online transaction is denied.

In some embodiments, the determining is carried out following completion of the specific online transaction. In such embodiments, in response to the probability being higher than the predefined, the specific online transaction is nullified.

In some embodiments, the method further includes, following the denying or the nullifying, notifying at least one of the specific user, a party with whom the specific transaction was carried out, or an enforcement authority, of the denying or the nullifying.

In some embodiments, the method further includes following the collecting and prior to the determining, transmitting at least part of the specific set of behavioral data to a server, and wherein the determining is carried out at the server.

In some embodiments, the collecting includes collecting at least part of the specific data set. In some such embodiments, the collecting, the determining, and the comparing are carried out iteratively until the probability exceeds the predefined threshold or until all data in the data set is collected.

In some embodiments, the method further includes, in response to the probability being lower than or equal to than the predefined threshold, indicative of the specific transaction being an authorized transaction, providing a safe transaction notification.

In some embodiments, the providing includes providing the notification to at least one of the specific user, a party with whom the specific transaction was carried out, or an enforcement authority that the specific transaction was a safe transaction.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

A better understanding of the disclosed technology will be obtained from the following detailed description of the preferred embodiments taken in conjunction with the drawings and the attached claims.

DETAILED DESCRIPTION OF EMBODIMENTS OF THE DISCLOSED TECHNOLOGY

In an embodiment of the disclosed technology, a multi-dimensional, learning classification model is used to identify or classify whether a computerized or online transaction is a coached fraudulent transaction, based on behavioral information relating to a user carrying out the transaction. Based on the likelihood of the computerized or online transaction being a coached fraudulent transaction, the system may deny or nullify the transaction. The classification may be carried out in real-time, or in retrospect after the transaction has been completed.

Embodiments of the disclosed technology will become clearer in view of the following description of the drawings.

Figure 1A:
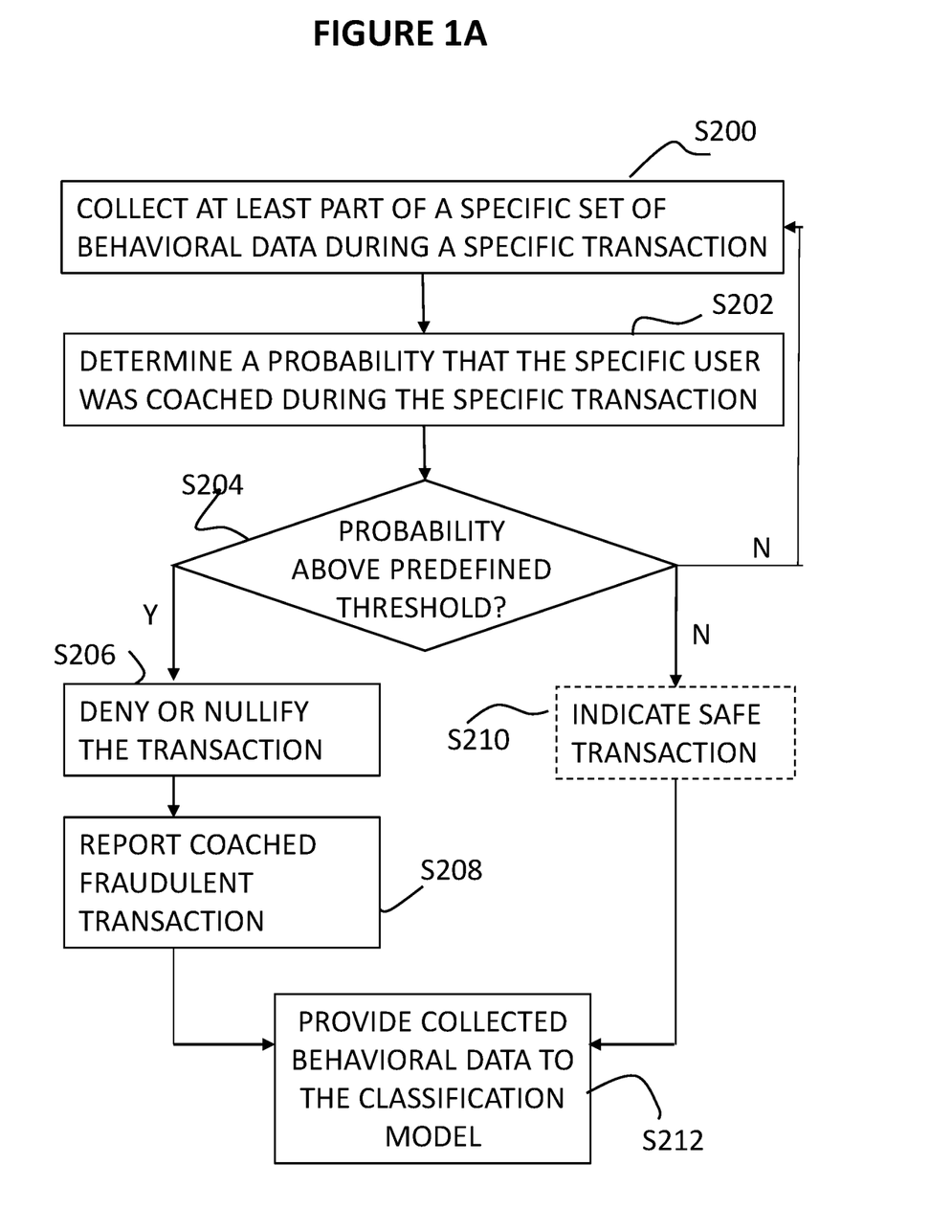
FIG. 1A is flowchart of a method for denying or nullifying a specific online transaction carried out while the user was coached by a fraudster according to an embodiment of the teachings herein.

Reference is now made to FIG. 1A, which is a flow chart of a method for denying or nullifying a specific online transaction carried out while the user was coached by a fraudster according to an embodiment of the teachings herein.

At an initial step S200 of the method, at least part of a specific set of behavioral data relating to the behavior of a specific user during a specific online transaction is collected. For example, the specific transaction may be a banking transaction, a shopping transaction, or an insurance related transaction. The specific user is an authorized user, authorized to carry out the specific transaction, and providing proper authentication information as required for the transaction.

At step S202, a multi-dimensional classification model is used to determine a probability that the specific set of behavioral data was collected while the specific, authorized, user was being coached by a third party. Stated differently, at step S202 the likelihood that the specific transaction was a vishing attack, is determined, using a classification model. In some embodiments, the classification model is a learning classification model, which was generated in advance of step S202, for example as described hereinbelow with respect to FIG. 1B.

At step S204, the probability determined by the classification model is compared to a predefined threshold. The probability obtained from the classification model exceeding the predefined threshold is indicative of the specific user having been coached during the specific online transaction.

In response to the probability being higher than the predetermined threshold, if the predefined threshold is exceeded, the specific online transaction is denied (if the determination is made in real-time) or is nullified (if the determination is retroactive) at step S206. In some embodiments, following a determination that the transaction is a coached fraudulent transaction, a report of the fraudulent transaction may be sent to an operator of the system (such as an operator of a server on which the transaction was carried out) and/or enforcement authorities, such as a cyber crime department of the police, at step S208. In other embodiments, before denying the transaction and after determining that a specific online transaction is being coached, the user is prompted to confirm that he or she wishes to proceed with the transaction. This prompt can include a warning that the person might be currently being duped into making a dangerous transaction and may ask the person if they are currently receiving instructions from another party to carry out the transaction. Based on the answers received to such queries to the user, the transaction may then be declined or voided in such embodiments of the disclosed technology.

Figure 2A:
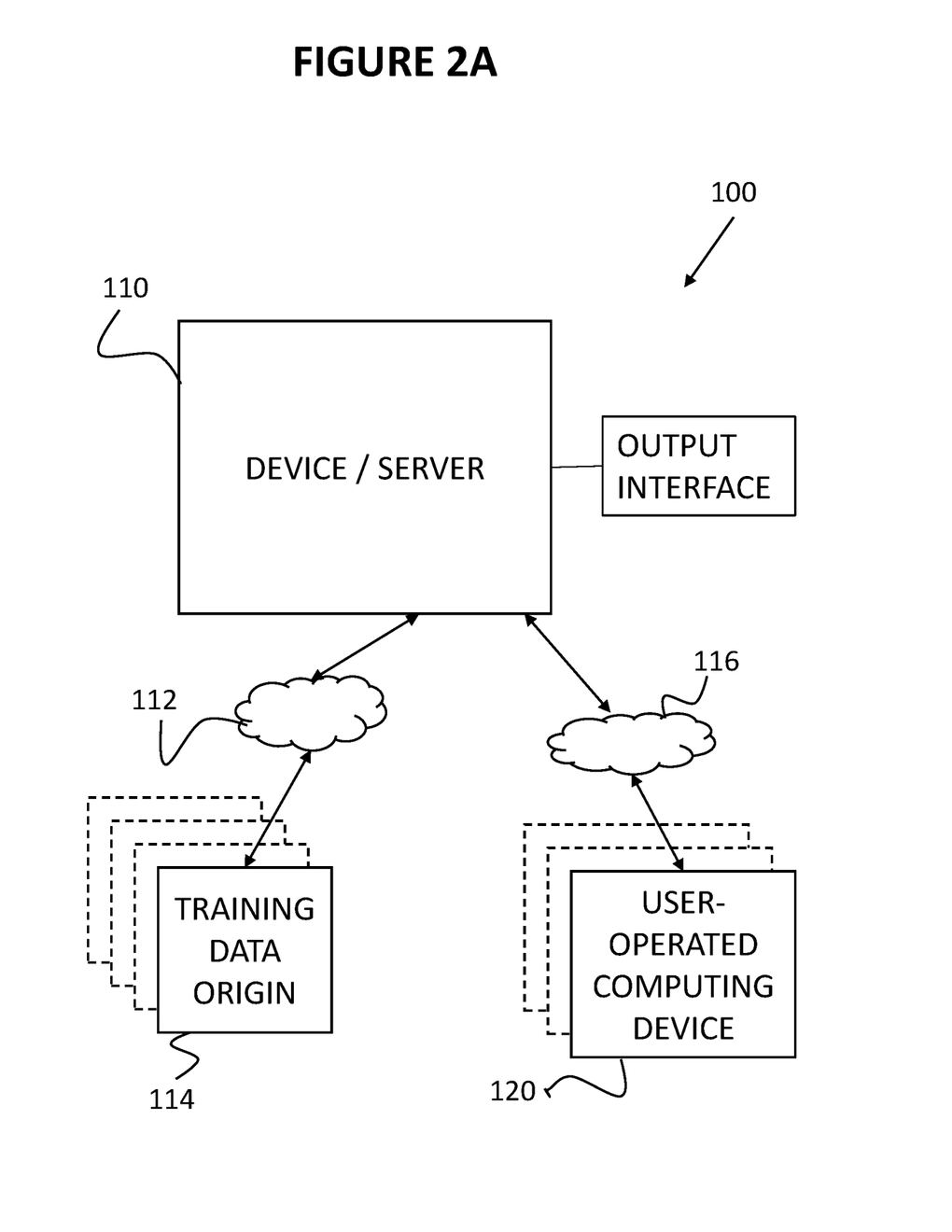
FIG. 2A is a block diagram of a system for denying or nullifying a specific online transaction carried out while the user was coached by a fraudster according to embodiments of the disclosed technology.
Figure 2B:
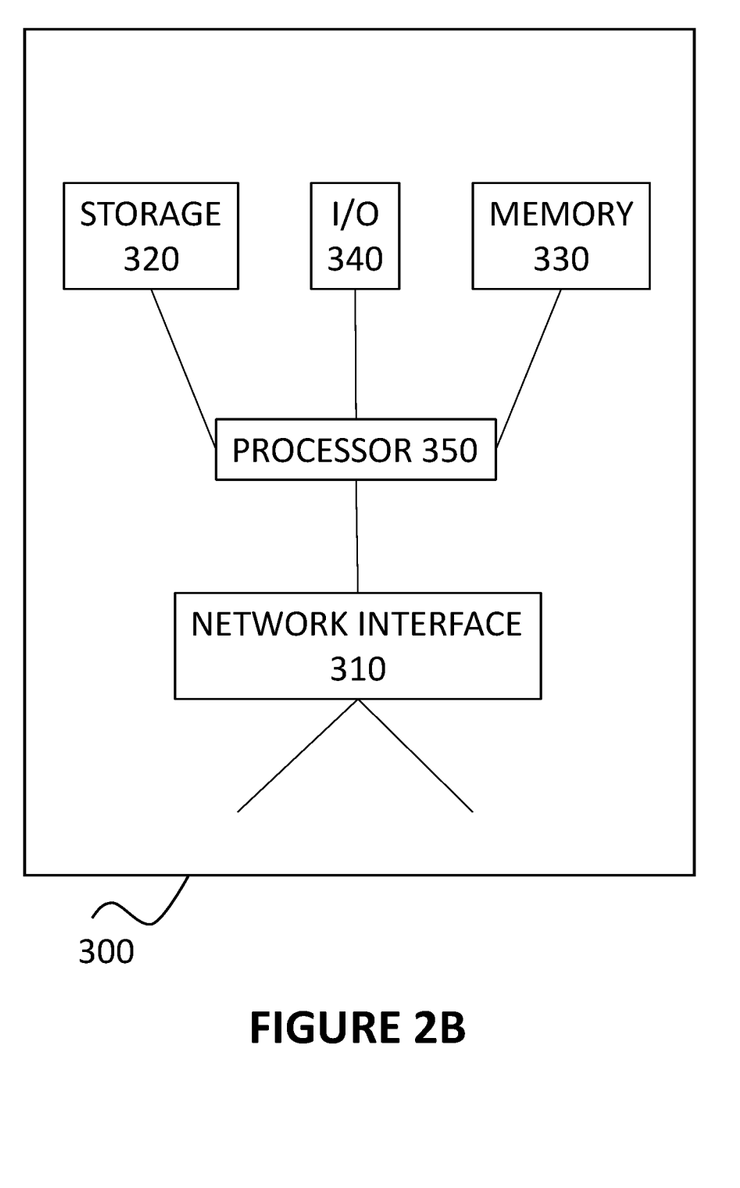
FIG. 2B is a high level block diagram of devices used to carry out embodiments of the disclosed technology.

In some embodiments, the classification model and/or the predefined threshold are stored in a central server, and the determination of probability at step S202 and the comparison to the predefined threshold S204 are carried out at the central server, for example as illustrated in FIGS. 2A and 2B. In some such embodiments, the data set collected at step S200, or a processed or modified version thereof, is provided to the central server, prior to step S202.

The sets of behavioral data collected at step S200 typically includes multiple behavioral parameters. The data is typically collected with respect to completion of an online form, which may include text fields, require cursor movement between fields, and involve operations carried out by input interface(s) such as a mouse and/or a keyboard.

In some embodiments, the behavioral parameters collected at step S200 are processed in real-time, as each behavioral parameter is collected. In some such embodiments, each time one or more behavioral parameters are collected at step S200, or are provided to the central server, the flow moves to step S200 to determine the probability that the transaction was a coached transaction based on the behavioral parameters received thus far. In such embodiments, if at step S204 it is determined that the predetermined threshold hasn't been met, the flow returns to step S200, to await collection of one or more additional behavioral parameters of the specific set of behavioral data, and thereafter the classification and evaluation of steps S202 and S204 may be repeated.

In other embodiments, while the behavioral parameters are collected in a staggered manner at step S200, an in some cases also transmitted to the central server in a staggered manner, the determination of a probability at step S202 and the comparison of the probability to the predefined threshold at step S204 occur only once, after all the behavioral parameters have been received. For example, the system may know what behavioral parameters are expected, and wait to receive input for all those parameters. As another example, the system may set a predefined time threshold such that if additional data is not received within a predetermined duration, the data set is considered to have been completed.

In yet other embodiments, the behavioral parameters collected at step S200 are collected at once, or are collected in a staggered manner but delivered to the central server at once, following collection of the whole data set, including all the behavioral parameters of the entire transaction. In such embodiments, the determination of probability at step S202 and the comparison of the probability to the predefined threshold at step S204 occur only once.

In cases in which steps S202 and S204 occur only once, if at step S204 it is determined that the probability of the online transaction being a coached transaction does not exceed the predefined threshold, the method may terminate. Alternatively, the method may include an additional step S210 in which an indication is provided that the transaction was a safe and valid transaction (i.e. safe from a behavioral perspective and representative of a transaction which lacks coaching by a third party seeking to illicitly gain funds). The indication may be provided, for example, to an operator of the central server, for example via an output interface thereof, or to the specific user via an output interface of a computing device used by the user.

In some embodiments, following completion of the safe transaction at step S210 and/or following denial or nullification of a transaction at step S206, at step S212, the dataset collected at step S200 is provided to the classification model, for further learning thereof.

Figure 1B:
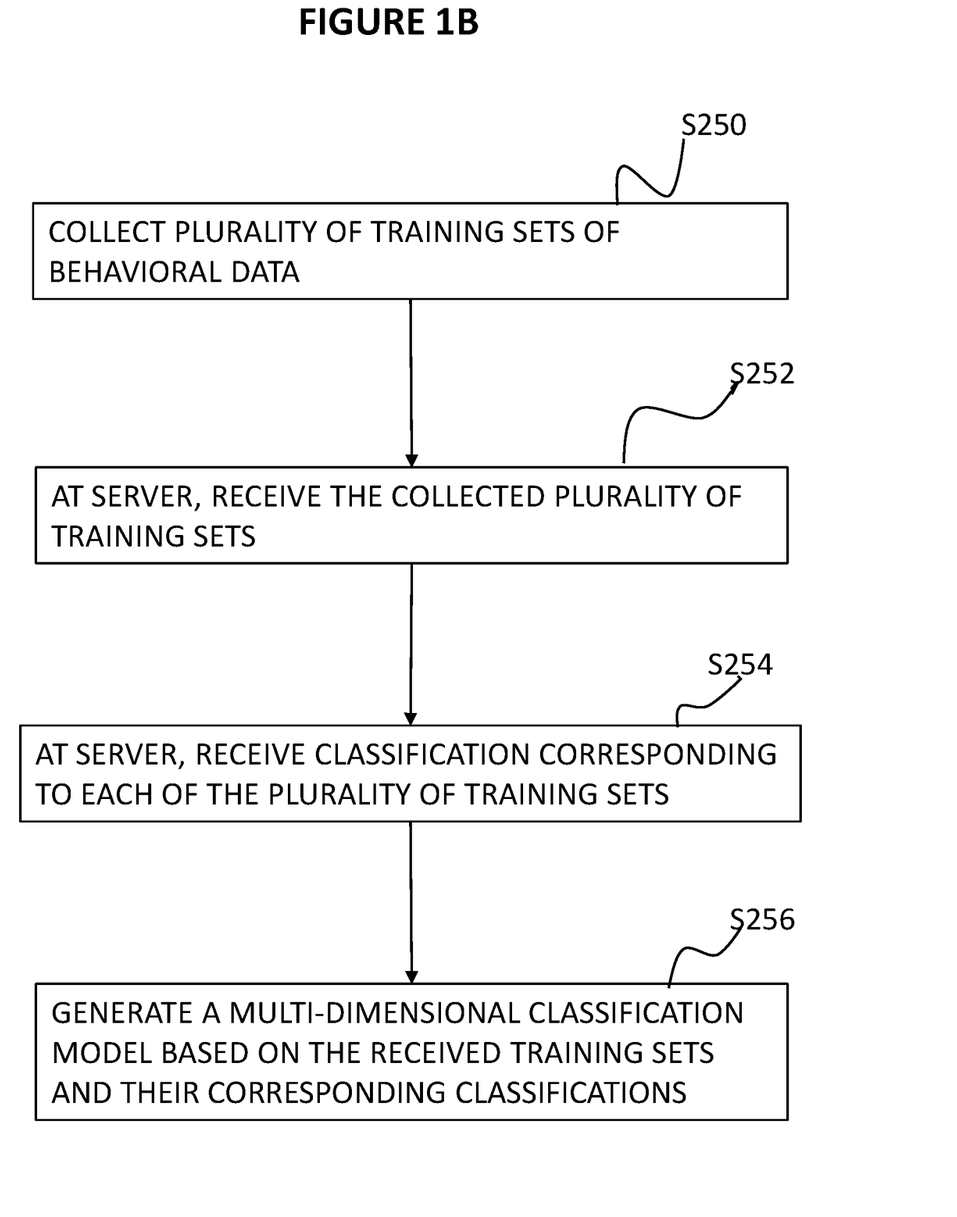
FIG. 1B is a flowchart of a method for creating a multi-dimensional classification model suitable for use in the method of FIG. 1A according to an embodiment of the disclosed technology.

Reference is now made to FIG. 1B, which is a flowchart of a method for creating a multi-dimensional classification model suitable for use in the method of FIG. 1A according to an embodiment of the disclosed technology.

At an initial, preparatory step S250, a plurality of training sets of behavioral data relating to the behavior of one or more users during one or more corresponding online transactions are collected. The training sets are typically collected by one or more computing devices on which the one or more transactions are carried out, and in some embodiments may then be transferred to a single training data origin device. Each training set of behavioral data is associated with a classification indicating whether or not that training set was generated when the user was coached during the corresponding online transaction.

At step S252, at least some of the collected training sets of behavioral data are provided to a central server. In such embodiments, the training sets are received from training data origin(s), and are the training sets that were collected at step S250. The classifications corresponding to each of the training sets of behavioral data may be received at step S254.

At step S256, a multi-dimensional classification model is generated, and is trained using the plurality of training sets of behavioral data received at step S252, and their corresponding classifications received at step S254.

In some embodiments, the plurality of training sets of behavioral data collected at step S250 relate to the behavior of a single user, during multiple online transactions. In some embodiments, the plurality of training sets of behavioral data collected at step S250 relate to the behavior of multiple users, and are collected during one or more online transactions conducted by each of the multiple users.

In some embodiments, at least one of the plurality of training sets of behavioral data relates to the specific user operating a specific computing device. In some such embodiments, the specific computing device may be one of the training data origins, or may be in communication with one of the training data origins for transmission of one or more collected training sets of behavioral data and corresponding classifications thereto. In some such embodiments, the specific computing device forms part of a packet switched network, or is in communication with one of training data origins via another packet switched network.

Typically, each of the plurality of training sets used to generate the classification model, collected at step S250 of FIG. 1B and the specific set of behavioral data of the specific transaction collected at step S200 of FIG. 1A includes at least two behavioral parameters selected from the group consisting of:
- a total timespan from selecting a text field for input thereinto, to leaving the text field, for at least one of a text field relating to a recipient account identifier, a text field relating to a recipient name, and a text field relating to an amount;
- a number of times during a corresponding online transaction that a corresponding user stops moving a cursor;
- a number of times during a corresponding online transaction that at least one of a plurality of cursor criteria is outside of a corresponding predetermined range;
- a timespan between selecting the text field relating to a recipient name and beginning to enter input into the text field relating to a recipient name;
- a total time spent on a monetary transfer page during the corresponding online transaction;
- a total time during which a cursor was immobile while interacting with the monetary transfer page during the corresponding online transaction;
- a timespan between selecting the text field relating to a recipient account identifier and beginning to enter input into the text field relating to a recipient account identifier; and
- a number of cursor engagements in the monetary transfer page during the corresponding online transaction.

In some embodiments, each data set may include at least three, at least four, or all of the behavioral parameters listed above, and/or multiple instances of any one or more of the behavioral parameters listed above.

In some embodiments, the input interface(s) of computing device used for collection of the datasets include a mouse. In some such embodiments, the cursor engagements comprise mouse clicks. In some such embodiments, the cursor criteria include, for a specific mouse gesture, any one or more of the following criteria:
- a ratio between the shortest distance between two endpoints of the specific mouse gesture and the length of the specific mouse gesture;
- a linearity measure indicating how similar the specific mouse gesture is to a straight line;
- a ratio between the length of the specific mouse gesture and the length of a perimeter of a rectangle enclosing the specific mouse gesture;
- a maximal change in the x-direction during the mouse gesture; and
- a maximal change in the y-direction during the mouse gesture.

In some embodiments, any one or more of the plurality of training sets used to generate the classification model and collected at step S250 of FIG. 1B and the specific set of behavioral data collected at step S200 of FIG. 1A, or each of these sets of behavioral data, may additionally include one or more additional behavioral parameters selected from the group consisting of:
- a timespan between selecting the text field relating to an amount of the transaction and beginning to enter input into that text field relating to the amount;
- a sum of all timespans of all cursor movements while on the monetary transfer page during the corresponding online transaction;
- a measure of the variability of ratios between the length of a specific cursor gesture or motion and the length of a perimeter of a rectangle enclosing the specific cursor gesture;
- a count of the total number of cursor gestures;
- a measure of the variability of straightness of cursor gestures or motions;
- a number of changes of horizontal direction which occur during cursor motions;
- an average speed of moving the cursor in all recorded cursor gestures;
- a number of keystrokes in a text field relating to the recipient account identifier, including typing errors and corrections thereof;
- a total timespan from leaving the text field relating to the amount of the transaction to a time of selecting a next text field for input thereinto;
- a number of times the 'backspace' or 'delete' keys are used while filling in the text field relating to the recipient account identifier;
- an average of ratios between the length of a specific cursor gesture or motion and the length of a perimeter of a rectangle enclosing the specific cursor gesture, for all cursor gestures;
- an average of the distance traveled with the cursor on the screen during a single cursor gesture;
- a measure of the variability of ratios between the shortest distance between two endpoints of the specific cursor gesture and the length of the specific cursor gesture;
- a measure of the variability of speeds of cursor gestures;
- a length of one or more cursor movements between selecting the text field relating to a recipient identifier of the transaction and beginning to enter input into that text field relating to the recipient identifier;
- a sum of the lengths of all cursor gestures;
- a number of keystrokes in a text field relating to the amount of the transaction, including typing errors and corrections thereof;
- a number of times the 'backspace' or 'delete' keys are used while filling in the monetary transfer page of the corresponding online transaction;

an average time duration between two consecutive cursor gestures while on the monetary transfer page of the corresponding online transaction;

an average measure of the straightness of all recorded cursor gestures;

a ratio of the sum of time between each pair of consecutive cursor gestures and the total time spent on the monetary transfer page of the corresponding online transaction;

a number of times the text field relating to an amount of the transaction is selected for insertion of data thereinto during navigating on the monetary transfer page of the corresponding online transaction;

a ratio between the number of times during a corresponding online transaction that at least one of a plurality of cursor criteria is outside of a corresponding predetermined range and a theoretical maximum number of times it is possible for all of the plurality of cursor criteria to be outside of the corresponding predetermined range;

a total timespan from leaving the text field relating to the recipient identifier to a time of selecting a next text field for input thereinto;

a total number of keystrokes during the time spent on the monetary transfer page of the corresponding online transaction, including typing errors and corrections thereof;

an average length of cursor gestures between two timestamps, both of the two timestamps occurring before selecting the text field relating to the amount of the transaction and beginning to enter input into that field;

a number of changes of vertical direction which occur during cursor motions;

a number of times the 'backspace' or 'delete' keys are used while filling in the text field relating to the recipient identifier;

a number of keystrokes during filling in the text field relating to the recipient identifier, including typing errors and corrections thereof;

a number of times the 'TAB' key was used while on the monetary transfer page of the corresponding online transaction;

a total timespan from leaving the text field relating to the recipient account identifier to a time of selecting a next text field for input thereinto;

an average timespan of a single cursor gesture;

a length of cursor movements between selecting of the text field relating to the recipient account identifier and beginning typing in that text field;

an average length of cursor gestures between two timestamps, both of the two timestamps occurring before selecting the text field relating to the recipient account identifier and beginning to enter input into that field;

a number of times the text field relating to the recipient account identifier is selected for insertion of data thereinto during navigating on the monetary transfer page of the corresponding online transaction; and a number of times the 'backspace' or 'delete' keys are used while filling in the text field relating to the amount of the transaction identifier.

Reference is now made to FIG. 2A, which is a block diagram of a system for denying or nullifying a specific online transaction carried out while the user was coached by a fraudster according to embodiments of the disclosed technology.

The system 100 includes a device 110, also termed a server 110 herein, for identifying a coached fraudulent transaction. Server 110 is connected, via one or more packet switched networks 112, to at least one training data origin 114, adapted to provide to server 110 a plurality of sets of behavioral data for a generating and training a classification model for classifying a probability that an online transaction is a coached fraudulent transaction. Server 110 is further connected, via a packet switched network 116, to at least one user operated computing device 120, adapted to be used by a specific user to carry out a specific online transaction.

In some embodiments, packet switched networks 112 and 116 may be a single packet switched network.

Server 110 typically includes at least one network interface for communication to packet switched networks 112 and/or 116, a server processor 132 in communication with the network interface, and a server non-transitory computer readable storage medium 134 storing instructions for execution by server processor 132. For example, storage medium 134 may store instructions for carrying out steps S202, S204, S206, S208, and/or S210 of FIG. 1A, and/or instructions for carrying out steps S252, S254, and/or S256 of FIG. 1B.

For example, during carrying out of steps S252 and S254, the plurality of training sets of behavioral data and the corresponding classifications may be received from the one or more training data origins 114. In some embodiments, the training sets of behavioral data may be collected on a single computing device forming a training data origin, and received by the server 110 as one or more transmissions from the single training data origin 114. In other embodiments, the training sets of behavioral data may be provided from multiple computing devices on which these training sets of data were collected, and may be received by the server 110 as multiple transmissions from multiple training data origins.

In some such embodiments, server 110 may be associated with an output interface 126, such as a screen or audio speaker, for providing output to an operator, or may include a communication interface for contacting enforcement authorities, for example when carrying out steps S206, S208, and/or S210.

FIG. 2B shows a high level block diagram of devices used to carry out embodiments of the disclosed technology. Device 300 comprises a processor 350 that controls the overall operation of the computerized device by executing the device's program instructions which define such operation. The device's program instructions may be stored in a storage device 320 (e.g., magnetic disk, database) and loaded into memory 330 when execution of the console's program instructions is desired. For example, the storage device 320 may store instructions for collecting a set of behavioral data during an online transaction. Thus, the device's operation will be defined by the device's program instructions stored in memory 330 and/or storage 320, and the console will be controlled by processor 350 executing the console's program instructions.

A device 300 also includes one or a plurality of input network interfaces for communicating with other devices via a network (e.g., the internet). The device 300 further includes an electrical input interface. A device 300 also includes one or more output network interfaces 310 for communicating with other devices. For example, the output network interfaces 310 may facilitate communication between device 300 and the central server.

Device 300 also includes input/output 340 representing devices which allow for user interaction with a computer (e.g., display, keyboard, mouse, speakers, buttons, etc.). Such input devices may be used when the user interacts with the computerized device during the online transaction, such that the data relating thereto can be collected by the processor.

One skilled in the art will recognize that an implementation of an actual device will contain other components as well, and that FIG. 3 is a high-level representation of some of the components of such a device for illustrative purposes. It should also be understood by one skilled in the art that the method and devices depicted in FIGS. 1A through 2A may be implemented on a device such as is shown in FIG. 2B.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A method for denying or nullifying a specific online transaction, carried out by an authorized user using a computing device associated with at least one input interface, while the authorized user was coached by a fraudster, the method comprising carrying out the following steps, in order:
   receiving, from said computing device, valid authentication information required for the specific online transaction, and authenticating the provider of said valid authentication information as said authorized user;
   following said authenticating of said authorized user, collecting, from said computing device, a specific set of behavioral data relating to the behavior of the authorized user during a specific online transaction, the authorized user being authenticated for carrying out said specific online transaction;
   using a multi-dimensional classification model, determining a probability that said specific set of behavioral data was collected while said authorized user was coached by a third party;
   comparing said probability to a predefined threshold; and
   in response to said probability being greater than said predefined threshold, indicative of said authorized user having been coached during said specific online transaction, denying or nullifying said specific online transaction, despite the entity carrying out the transaction being the authorized user,
   wherein said multi-dimensional classification model is trained prior to said determining, using a plurality of training sets of behavioral data relating to the behavior of one or more users during an online transaction, where each specific training set is associated with a classification indicating whether said specific training set was generated when the corresponding user was coached during the corresponding online transaction, and
   wherein each of said plurality of training sets and said specific set of behavioral data includes at least two behavioral parameters selected from the group consisting of:
   a total timespan from selecting a text field for input thereinto, to leaving the text field, for at least one of a text field relating to a recipient account identifier, a text field relating to a recipient name, and a text field relating to an amount;
   a number of times during a corresponding online transaction that a corresponding user stops moving a cursor;
   a number of times during a corresponding online transaction that at least one of a plurality of cursor criteria is outside of a corresponding predetermined range;
   a timespan between selecting said text field relating to a recipient name and beginning to enter input into said text field relating to a recipient name;
   a total time spent on a monetary transfer page during said corresponding online transaction;
   a total time during which a cursor was immobile while interacting with said monetary transfer page during said corresponding online transaction;
   a timespan between selecting said text field relating to a recipient account identifier and beginning to enter input into said text field relating to a recipient account identifier; and
   a number of cursor engagements in said monetary transfer page during said corresponding online transaction.

2. The method of claim 1, wherein the at least one input interface includes a mouse and wherein:
   said cursor engagements comprise mouse clicks; and
   said cursor criteria include, for a specific mouse gesture, at least one of the following criteria:
      a ratio between the shortest distance between two endpoints of said specific mouse gesture and the length of said specific mouse gesture;
      a linearity measure indicating how similar said specific mouse gesture is to a straight line;
      a ratio between said length of said specific mouse gesture and the length of a perimeter of a rectangle enclosing said specific mouse gesture;
      a maximal change in the x-direction during said mouse gesture; and
      a maximal change in the y-direction during said mouse gesture.

3. The method of claim 1, wherein said specific online transaction is a banking transaction.

4. The method of claim 1, wherein said specific set of behavioral data includes data relating to the entirety of said specific online transaction.

5. The method of claim 1, wherein said collecting and said determining are carried out in real time, during said specific online transaction, and wherein, in response to said probability being greater than said predefined threshold, said specific online transaction is denied.

6. The method of claim 1, wherein said determining is carried out following completion of said specific online transaction, and wherein, in response to said probability being greater than said predefined threshold, said specific online transaction is nullified.

7. The method of claim 1, further comprising, following said denying or said nullifying, notifying at least one of said authorized user, a party with whom said specific transaction was carried out, or an enforcement authority, of said denying or said nullifying.

8. The method of claim 1, further comprising, following said collecting and prior to said determining, transmitting at least part of said specific set of behavioral data to a central server, and wherein said determining is carried out at said central server.

9. The method of claim 1, wherein:
   said collecting comprises collecting at least part of said specific data set; and said collecting, said determining, and said comparing are carried out iteratively until said probability exceeds said predefined threshold or until all data in said data set is collected.

10. The method of claim 1, further comprising, in response to said probability being lower than or equal to said predefined threshold, indicative of said specific transaction being an authorized transaction, providing a safe transaction notification.

11. The method of claim 10, wherein said providing comprises providing said notification to at least one of said authorized user, a party with whom said specific transaction was carried out, or an enforcement authority that said specific transaction was a safe transaction.

12. The method of claim 1, wherein in said response to said probability being greater than said predefined threshold, before said denying or nullifying said specific online transaction, sending data via a network to said computing device sufficient to prompt said authorized user to warn said authorized user of a potential fraudulent or coached transaction, or querying said authorized user for whether said authorized user is talking to a third party, and carrying out said denying or nullifying of said specific online transaction based on a response or lack of response within a set time period received from said authorized user via said network.

13. The method of claim 1, wherein the determining of the probability comprises determining a likelihood that the specific online transaction was a vishing attack by the third party, using the multi-dimensional classification model.

14. The method of claim 1, wherein the multi-dimensional classification model is a learning classification model, generated in advance of the determining of the probability.

15. The method of claim 1, wherein collecting of the specific set of behavioral data, the determining of the probability, and the comparing of the probability are carried out iteratively, in real-time, each time one or more behavioral parameters forming part of the specific set of behavioral data are collected.

16. A network designed to deny or nullify a specific online transaction initiated or attempted to be initiated by an authorized user using a computing device at a first network node on said network, said computing device associated with at least one input interface, while the authorized user was coached by a fraudster, data sent via said network including, in order:
  valid authentication information required for authenticating the authorized user for the specific online transaction;
  an indication that the authorized user has been authenticated;
  a specific set of behavioral data relating to the behavior of the authorized user during a specific online transaction, the authorized user being authorized for carrying out said specific online transaction;
  data comparing a probability that said specific set of behavioral data was collected while said specific user was coached by a third party to a predefined threshold, the probability being determined using a multi-dimensional classification model;
  and
  in response to said probability being greater than said predefined threshold, indicative of said authorized user having been coached during said specific online transaction, data causing a denial or nullification of an attempted transaction despite the receipt of the valid authentication information,
wherein said multi-dimensional classification model is trained prior to said determining, using a plurality of training sets of behavioral data relating to the behavior of one or more users during an online transaction, where each specific training set is associated with a classification indicating whether said specific training set was generated when the corresponding user was coached during the corresponding online transaction, and
wherein each of said plurality of training sets and said specific set of behavioral data includes at least two behavioral parameters selected from the group consisting of:
  a total timespan from selecting a text field for input thereinto, to leaving the text field, for at least one of a text field relating to a recipient account identifier, a text field relating to a recipient name, and a text field relating to an amount;
  a number of times during a corresponding online transaction that a corresponding user stops moving a cursor;
  a number of times during a corresponding online transaction that at least one of a plurality of cursor criteria is outside of a corresponding predetermined range;
  a timespan between selecting said text field relating to a recipient name and beginning to enter input into said text field relating to a recipient name;
  a total time spent on a monetary transfer page during said corresponding online transaction;
  a total time during which a cursor was immobile while interacting with said monetary transfer page during said corresponding online transaction;
  a timespan between selecting said text field relating to a recipient account identifier and beginning to enter input into said text field relating to a recipient account identifier; and
  a number of cursor engagements in said monetary transfer page during said corresponding online transaction.

* * * * *